US 7,899,741 B2

(12) United States Patent
Hooley et al.

(10) Patent No.: US 7,899,741 B2
(45) Date of Patent: Mar. 1, 2011

(54) LOSS IMPACT TRACKING SYSTEM AND METHOD

(75) Inventors: Craig Hooley, Pasadena, CA (US);
Honey Kalla, Simi Valley, CA (US);
Hari Vivek, Simi Valley, CA (US); Paul Lindemann, Simi Valley, CA (US);
Esteban C. Vivanco, Northridge, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 11/727,884

(22) Filed: Mar. 28, 2007

(65) Prior Publication Data
US 2008/0243678 A1 Oct. 2, 2008

(51) Int. Cl.
*G06Q 40/00* (2006.01)
(52) U.S. Cl. .................................................... 705/38
(58) Field of Classification Search ................ 705/36, 705/38, 35
See application file for complete search history.

(56) References Cited

U.S. PATENT DOCUMENTS

| | | | |
|---|---|---|---|
| 6,058,369 A | | 5/2000 | Rothstein |
| 6,067,533 A | * | 5/2000 | McCauley et al. ............ 705/38 |
| 2002/0019804 A1 | | 2/2002 | Sutton |
| 2003/0036994 A1 | * | 2/2003 | Witzig et al. .................. 705/38 |
| 2003/0093366 A1 | | 5/2003 | Halper et al. |
| 2004/0010443 A1 | | 1/2004 | May et al. |
| 2004/0078318 A1 | * | 4/2004 | Miller ........................... 705/38 |
| 2004/0138995 A1 | | 7/2004 | Hershkowitz et al. |
| 2004/0153330 A1 | | 8/2004 | Miller et al. |
| 2004/0177031 A1 | * | 9/2004 | Shapiro et al. ................ 705/38 |
| 2004/0225587 A1 | | 11/2004 | Messmer et al. |
| 2004/0267660 A1 | | 12/2004 | Greenwood et al. |
| 2005/0021360 A1 | | 1/2005 | Miller et al. |
| 2005/0080702 A1 | * | 4/2005 | Modi ............................ 705/36 |
| 2006/0059073 A1 | | 3/2006 | Walzak |
| 2006/0085325 A1 | | 4/2006 | Jammal et al. |
| 2006/0271472 A1 | | 11/2006 | Cagan |
| 2007/0143123 A1 | * | 6/2007 | Goldberg et al. ............... 705/1 |

FOREIGN PATENT DOCUMENTS

WO  WO 03/090130  10/2003

* cited by examiner

*Primary Examiner*—James A Kramer
*Assistant Examiner*—Hao Fu
(74) *Attorney, Agent, or Firm*—Michael A. Springs; Stan Torgovitsky; Roylance, Abrams, Berdo & Goodman, LLP

(57) ABSTRACT

Methods and systems for assisting analysis of potential gain or loss associated with acquiring property, and analysis of data related to disaster (such as due to flood, fire, etc.) affected properties with delinquent payments to determine the appropriate equity decision regarding a foreclosure action on one or more liens associated with the property. Loans and information associated therewith are assigned to one of the status queues that include a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by the lender. Multiple liens associated with a subject property can be displayed and analyzed to facilitate assessment of the loan and recommendations for disposition thereof. Insurance payment information for disaster-affected underlying properties is displayed and can be taken into account when assessing the loan and formulating recommendations for disposition thereof.

20 Claims, 11 Drawing Sheets

700

| Valuation Data | | 710 |
|---|---|---|
| Origination Appraisal Date | 07/2004 | 720 |
| Origination Appraisal Amount | $131,000.00 | 730 |
| Appraisal Date | | 740 |
| Appraisal Amount Marketable | $0.00 | |
| | | BPO 750 |

Loan Number:67621321

| BPO Date | BPO Amount (Market/As is/Repaired) 820 | Reconcile Amount 830 |
|---|---|---|
| 3/6/2006 | $134,500.00/$134,500.00/$134,500.00 | $0.00 |
| 3/6/2006 | $130,000.00/$130,000.00/$130,000.00 | $0.00 |

Loan Number:67621329

| BPO Date | BPO Amount (Market/As is/Repaired) | Reconcile Amount |
|---|---|---|
| 1/12/2006 | $139,000.00/$139,000.00/$139,000.00 | $0.00 |

FIG. 8

| Related Loan Information | | 960 | 970 |
|---|---|---|---|
| | | Lien Information | Lien Information |
| Position — 910 | | 1 | 2 |
| Loan# — 912 | | 101226515 | 101226515 |
| Lien Holder — 914 | | | |
| Investor — 916 | | | |
| Interest PTD — 918 | | | |
| Interest Rate — 920 | | 0% | 0% |
| NOD — 922 | | | |
| FCL Sale Date — 924 | | | |
| BK Date — 926 | | | |
| BK Status — 928 | | NOT ACTIVE | NOT ACTIVE |
| Principal Balance — 930 | | $51,431.59 | $51,431.59 |
| Escrow Balance — 932 | | ($118.88) | ($118.88) |
| Fees Due — 934 | | ($37,447.80) | ($37,447.80) |
| Interest — 936 | | $3,887.28 | $3,887.28 |
| TotalDebt — 938 | | $17,752.19 | $17,752.19 |
| Disaster Analysis Status — 940 | | Management | Management |
| Date — 942 | | 3/31/2006 8:43:25 AM | 3/31/2006 8:43:25 AM |
| Estimated Net Recovery — 944 | | 0 | 0 |
| Estimated Loss/Gain% — 946 | | 0 | 0 |
| ROI — 948 | | 0 | 0 |
| Reccomendation — 950 | | Foreclose | Foreclose |

FIG. 9B

| Acquire And Liquidate Scenario | Default | Probable | Breakeven |
|---|---|---|---|
| UPB — 1010 | $51,431.59 | $51,431.59 | $51,431.59 |
| Interest — 1012 | $3,887.28 | $3,887.28 | $3,887.28 |
| Tax Expense — 1014 | $0.00 | $0.00 | $0.00 |
| Insurance Expense — 1016 | $0.00 | $0.00 | $0.00 |
| Foreclosure Expense — 1018 | $1,691.06 | $0.00 | $0.00 |
| Bankruptcy Expense — 1020 | $264.04 | $0.00 | $0.00 |
| Eviction Expense — 1022 | $264.87 | $0.00 | $0.00 |
| Fees Due — 1024 | ($37,447.80) | ($37,447.80) | ($37,447.80) |
| Escrow Balance — 1026 | ($118.88) | ($118.88) | ($118.88) |
| Projected Book as of REO Liquidation — 1028 | $19,972.16 | $17,752.19 | $17,752.19 |

FIG. 10

| REO Analysis | Default | Probable | Breakeven |
|---|---|---|---|
| Established Value — 1110 | $8,000.00 | $50,000.00 | $0.00 |
| Commission — 1112 | $2,500.00 | $3,000.00 | $0.00 |
| Closing Cost & Title — 1114 | $120.00 | $750.00 | $0.00 |
| Miscellaneous Fees — 1116 | $0.00 | $0.00 | $0.00 |
| Established Damage — 1118 | $24,999.00 | $24,999.00 | $24,999.00 |
| Additional Damage Estimate — 1120 | $0.00 | ($14,999.00) | $0.00 |
| Projected Net Proceeds — 1122 | ($19,619.00) | $36,250.00 | ($24,999.00) |

If the loan analyzed is in first lien position, the following section will appear: 1130

| | Default | Probable | Breakeven |
|---|---|---|---|
| Senior Lien — 1132 | $0.00 | $0.00 | $0.00 |
| Senior Escrow, Fees Due, Interest, FCL/BK/Eviction — 1134 | $0.00 | $0.00 | $0.00 |

If the loan analyzed is in Jr. lien position, the following section will appear: 1140

| | Default | Probable | Breakeven |
|---|---|---|---|
| Senior Lien #1 — 1142 | $51,431.59 | $51,431.59 | $51,431.59 |
| Senior Lien #1 Escrow, Fees Due, Interest, FCL/BK/Eviction — 1144 | ($31,459.43) | ($33,679.40) | ($33,679.40) |
| Senior Total Debt — 1146 | $19,972.16 | $17,752.19 | $17,752.19 |

FIG. 11

| Recap | Default | Probable | Breakeven |
|---|---|---|---|
| Net Sales Proceeds — 1210 | ($19,619.00) | $36,250.00 | ($24,999.00) |
| Investment — 1212 | $33,771.78 | $29,331.84 | $29,331.84 |
| Difference — 1214 | ($53,390.78) | $6,918.16 | ($54,330.84) |
| Subject Lien — 1216 | $19,972.16 | $17,752.19 | $17,752.19 |
| Net Recovery — 1218 | ($39,591.16) | $18,497.81 | ($42,751.19) |
| Projected ROI — 1220 | (198.23%) | 104.20% | (240.82%) |
| Walk severity Loss Severity — 1222 | $11,579.65 | $11,579.65 | $11,579.65 |
| Net Recovery If Acquired as REO — 1224 | ($39,591.16) | $18,497.81 | ($42,751.19) |
| Variance Loss Reduction / (Increase) — 1226 | ($28,011.51) | $30,077.46 | ($31,171.54) |
| Balboa Projected VS Actual — 1228 | 202.99% | 259.74% | 269.19% |

FIG. 12

LOSS IMPACT TRACKING SYSTEM AND METHOD

FIELD OF THE INVENTION

The present invention relates generally to advantageous methods and systems that enable efficient analysis of potential gains or losses associated with acquiring property. In particular, embodiments of the present invention find application in analysis of data related to disaster (such as due to flood, fire, etc.) affected properties for which payment is delinquent to determine the appropriate equity decision regarding any foreclosure action on one or more liens associated with the property.

BACKGROUND OF THE INVENTION

Generally, when someone purchases real property, such as a home, the borrower borrows money in the form of a mortgage to provide the funds to cover the majority of the purchase price of the property. A mortgage is a lien against the purchased property and is secured by the collateral of the specified property. In return for the loan, the borrower is obliged to pay back the amount of the mortgage plus interest within a specified period of time with a predetermined set of payments.

In addition to the mortgage, a home owner can borrow money in the form of, for example, a home equity line of credit (HELOC) to provide additional funds to, for example, pay for improvements to the home. A HELOC is another type of lien against the purchased property which is also secured by the collateral of the specified property. As in the case of a mortgage, the borrower is obliged to pay back the amount of the loan borrowed under a HELOC, plus interest, within a specified period of time with a predetermined set of payments. Thus, a single underlying property may have multiple liens associated therewith, such as a mortgage and a HELOC.

When multiple liens are associated with a single underlying property, the liens have different priority (i.e., positions) as to the repayment thereof. A senior lien or mortgage is entitled to be paid first in, for example, foreclosure before a junior lien. In this regard, a foreclosure is the legal proceeding in which the lender sells or repossesses a parcel of the real estate due to the owner's failure to comply with the terms of the loan. Commonly, the violation of the mortgage is a default in payment of a promissory note, secured by a lien on the property.

When the loan is being foreclosed, lien holders face the risk of not being able to recoup all of the money lent to the borrower due to, for example, reduced value of the real property and/or other fees associated with the foreclosure proceeding. Furthermore, junior lien holders are likely to suffer a more substantial loss then senior lien holders, since the senior lien holders are paid-off first. Accordingly, when lending money to a potential borrower, lenders evaluate risks associated with the potential loan.

Conventional tools that facilitate risk assessment associated with a loan involve evaluation of the borrower's credit worthiness to determine the likelihood that the borrower defaults on the payments and market trends to determine present and future value of the underlying property. Other methods for risk assessment involving a lender that holds a large number of loans include performing diagnostics where an indication of the likelihood of a lender suffering a loss in the event of the default is based on probability analysis of individual loans or groups of loans as described in US Patent Application, Publication No. US2006/0271472. Still other methods include risk assessment within a predetermined market that use an optimization function and standard multivariate nonlinear regression to process borrower-specific information, based on credit factors associated with borrowers who default as well as borrowers who never defaulted on loans, to compute the probability of default by the specific borrower, as described in US Patent Application, Publication No. US2006/0085325.

While the conventional methods described above may be useful in assessing the risks of loss when a lender is contemplating whether grant to a borrower a loan secured by the underlying property, such conventional methods are not helpful when a lender is faced with a decision regarding an existing loan that is in default. For example, when the underlying property has been damaged or destroyed due to a disaster (such as flood, fire, hurricane, etc.), the lender is faced with various options for disposition of the loan and/or the underlying property including foreclosing on the loan, selling the property or simply walking away from the loan/property without incurring any further costs.

The various options available to the lender have various factors associated therewith that impact the losses that the lien holder may incur depending on the selected option. Such cost factors include, but are not limited to, the lender's position as a lien holder (i.e., junior or senior), the costs associated with each of the possible options for disposition of loan/property (e.g., foreclosure fee, broker fee, etc.), and insurance coverage/payments on the underlying property.

Accordingly, there is a need for a system and method for evaluating loans associated with properties that have been affected by a disaster to facilitate a lien holder's decision for disposition of the loan/property.

SUMMARY OF THE INVENTION

In view of the aforementioned conventional approaches to analysis of mortgage loans and risks associated with real estate loans, exemplary embodiments of the present invention offer a beneficial alternative where lien analysis facilitates a lien holder's decision-making with regard to disposition of the associated real estate loan on a subject, for example, disaster affected properties.

One objective of certain exemplary embodiments of the present invention is to facilitate loss impact tracking analysis for loans on disaster-affected properties.

Another objective of certain exemplary embodiments of the present invention is to facilitate loss impact tracking analysis for loans on disaster-affected properties having multiple liens associated therewith.

Yet another objective of certain exemplary embodiments of the present invention is to facilitate loss impact tracking analysis for loans by taking into account insurance claims associated with damage to the underlying property.

Accordingly, exemplary embodiments of the present invention provides a method and a system for performing loan analysis where loans and information associated therewith are assigned to one of the status queues that include a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by the lender.

The loan and loan information associated therewith are retrieved from at least one of the status queues to be displayed, analyzed and updated based on the analysis. Updating the loan information includes entering a recommendation for disposition of the loan based on the analysis, and the recommendations include an indication of foreclosure, bid-at-sale or disposition without any further action. The loan and loan information associated therewith can then be re-assigned to at least one of the status queues based on the updated information.

According to an exemplary implementation of certain embodiments of the present invention, a system and method are provided where multiple liens associated with a subject property can be displayed and analyzed to facilitate assessment of the loan and recommendations for disposition thereof.

According to another exemplary implementation of certain embodiments of the present invention, a system and method are provided where insurance payment information for disaster-affected underlying properties is displayed and can be taken into account when assessing the loan and formulating recommendations for disposition thereof.

According to another exemplary embodiment of the present invention, a computer readable medium is provided having stored thereon computer executable instructions for performing loan analysis, the instructions comprising assigning loans and information associated therewith to one of the status queues that include a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by lender. The instructions further include a set of instructions for retrieving the loan and loan information associated therewith from at least one of the status queues to be displayed, analyzed and updated based on the analysis. The instructions further included a set of instructions for updating the loan information including providing interactive entry of recommendations for disposition of the loan based on the analysis, where the recommendations include an indication of foreclosure, bid-at-sale or disposition without any further action. The instructions further include a set of instructions for re-assigning the loan and loan information associated therewith to at least one of the status queues based on the updated information.

BRIEF DESCRIPTION OF THE DRAWINGS

The above aspects and features of the present invention will be more apparent by describing certain exemplary embodiments of the present invention with reference to the accompanying drawings, in which like reference numerals will be understood to refer to like parts, components and structures, where:

FIG. 7 illustrates a display of further detailed information of an individual loan selected for analysis according to an exemplary embodiment of the present invention.

FIG. 8 illustrates a display that, according to an exemplary embodiment of the present invention, may be accessible from the display of FIG. 7 for providing further detailed information associated with the information displayed in FIG. 7.

FIG. 9B illustrates a side-by-side display of summary information for multiple liens associated with an individual loan selected for analysis according to an exemplary embodiment of the present invention.

FIG. 10 illustrates a display associated with an exemplary scenario for a loan selected for analysis according to an exemplary embodiment of the present invention.

FIG. 11 illustrates a display associated with detailed analysis of a selected loan according to an exemplary embodiment of the present invention.

FIG. 12 illustrates a display of information presented upon completion of analysis of a selected loan according to an exemplary embodiment of the present invention.

It is to be noted that through the drawings, numerical values (such as dollar amounts, and negative amounts shown in parentheses) are shown in various fields of exemplary displays merely for illustrative purposes and are not indicative of the actual computed or retrieved values that may be obtained according to exemplary embodiments of the present invention. One of ordinary skill in the art will readily appreciate that accurate values are obtained by implementing formulas and applying criteria which are well known and understood in the mortgage industry.

DETAILED DESCRIPTION OF EXEMPLARY EMBODIMENTS

Exemplary embodiments of the present invention are discussed in detail below. While specific methods and values are discussed, it should be understood that this is done for illustration purposes only. A person skilled in the relevant art will recognize that other specific methods and values may be used without departing from the spirit and scope of the invention.

Figure 1:
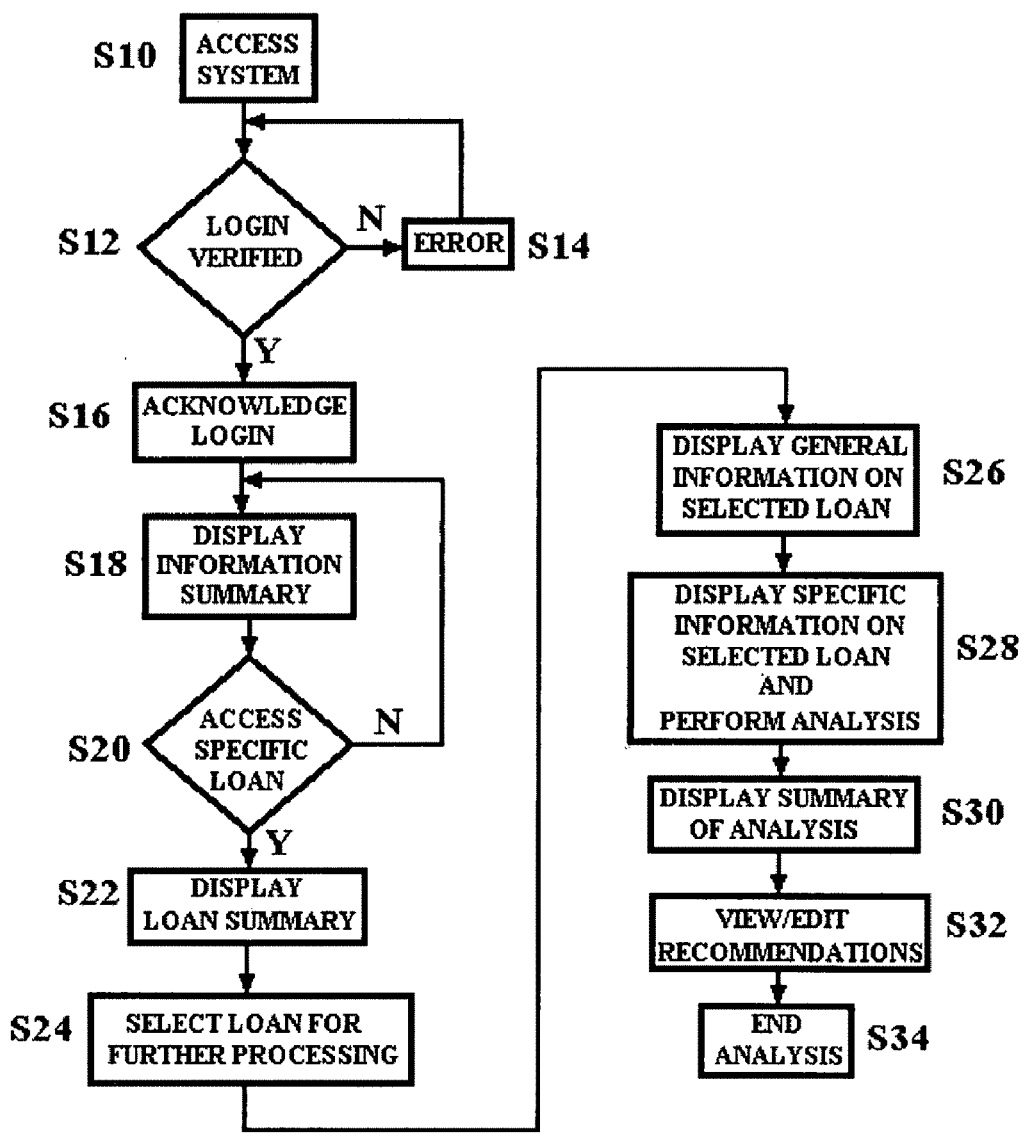
FIG. 1 is a flow chart outlining general flow of analysis and displays according to an exemplary embodiment of the present invention.

According to exemplary embodiments of the present invention, as illustrated in the flow diagram of FIG. 1, loss impact tracking analysis begins with accessing, S10, a system that facilitates interactive display and manipulation of information, and provides access to data related to properties that are the subject of the analysis. The available information and data includes, but is not limited to, zone of the property as defined by Federal Emergency Management Agency (FEMA), flood insurance that may cover the property, disaster inspection status of the property that has been impacted by disaster, estimated damage account of the property, loss draft status and balances associated with the property.

In addition to the FEMA-defined zone, the available information can also include a zone of the property as defined by, for example, a lien-holder of the property, or the user of the loss impact tracking system. The available information may also incorporate valuation data including the origination amount of loan(s) associated with the property and Broker's Price Opinions (BPOs) or inspection(s) for the property completed within a certain amount of time (for example, six months). From the data gathered, a probable market value, net proceeds and estimated losses associated with an individual lien can be analyzed.

The system according to various non-limiting embodiments of the present invention can be implemented as a software program, or a set of computer-executable instructions, on any one of a stand-alone system, a system comprising a local area network, or a system comprising remotely-accessible network, server or computer.

Figure 2A:
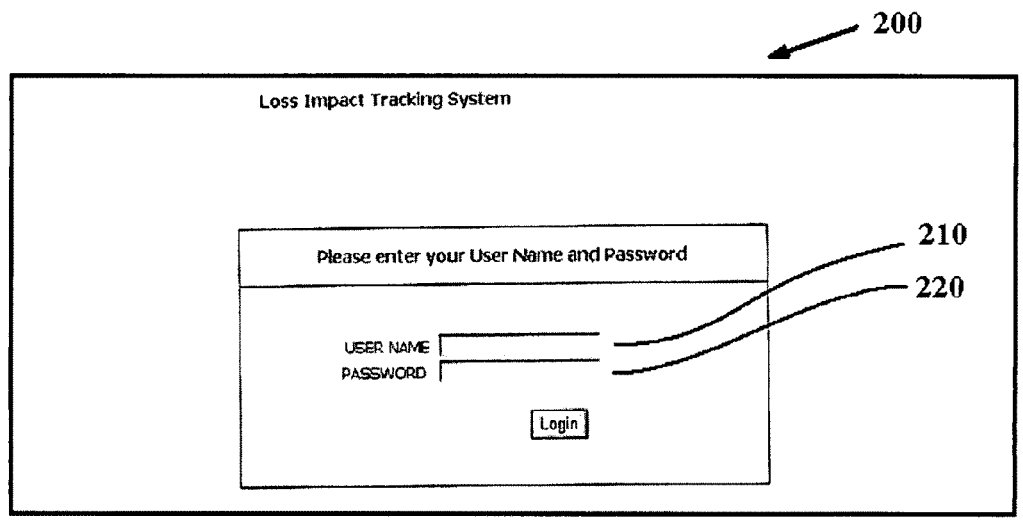
FIGS. 2A and 2B illustrate an example of displays associated with a login procedure according to an exemplary embodiment of the present invention.

As shown in FIG. 2A, in an exemplary implementation a system can be accessed from a web browser via a login screen where a specific username 210 and password 220 combination is entered in an interactive login display 200. User name and password can, for example, be the same as those set up by, or assigned to, the user for network sign-on. As can be readily appreciated by skilled artisans, various accessibility protocols and procedures can be implemented for accessing the system according to exemplary embodiments of the present invention to provide the desired levels of security and convenience. For example, verification based on biometric user information, such as fingerprints, may be advantageously employed to access the system. As illustrated in FIG. 1, the login verification, S12, can be repeated if the verification is not successful (for example, due to improper password—user name combination) after displaying an error, S14, in a manner well known to skilled artisans.

Figure 2B:
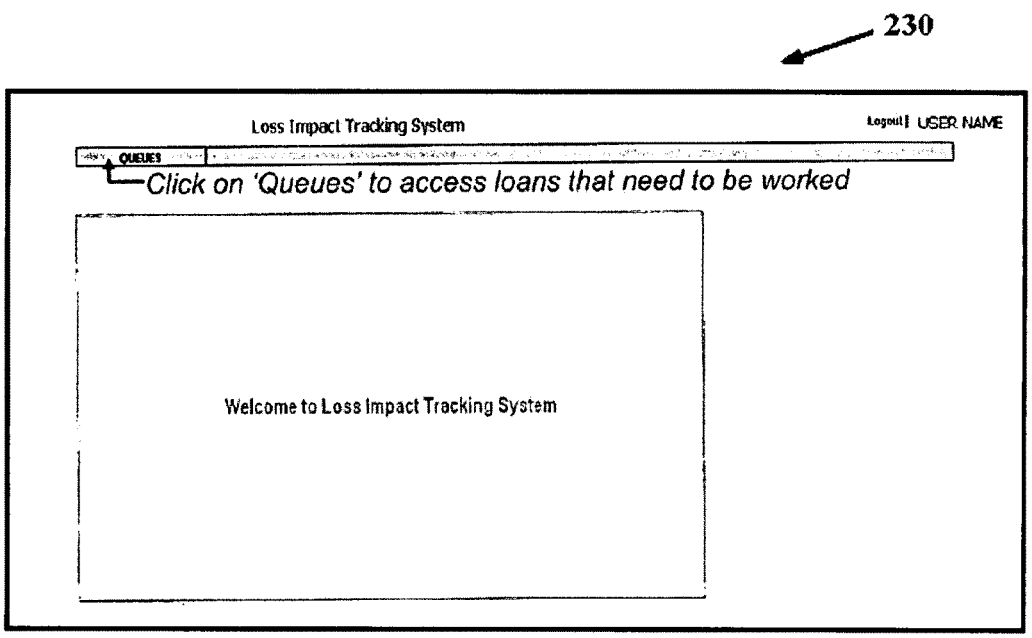
Figure 3:
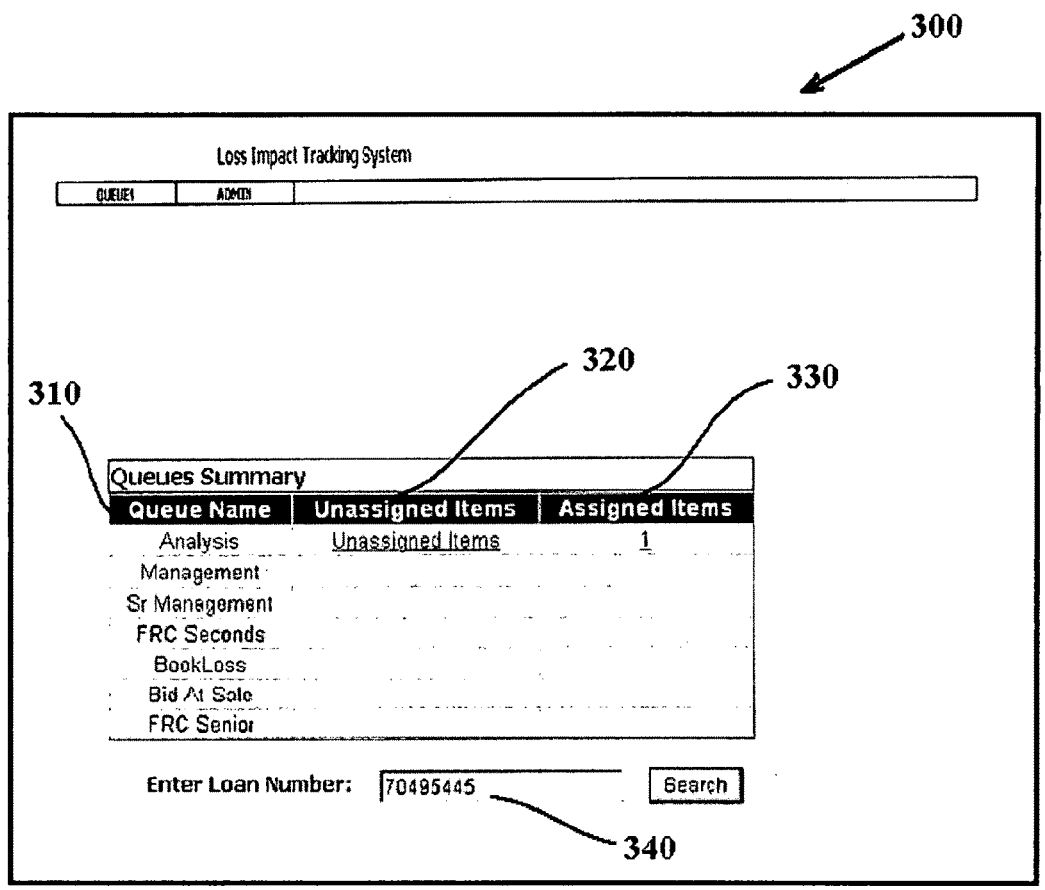
FIG. 3 illustrates a display associated with a summary of queues to which loans under analysis may be organized according to an exemplary embodiment of the present invention.

Referring to FIG. 1, after proper system access information has been confirmed and a user has been informed of successful log-on into the system, S16, as shown for example in display 230 of FIG. 2B, summary of information available for review and analysis is displayed, S18. The summary of information can include a summary of loans that are available for review and/or analysis, as shown in FIG. 3. While the information indicative of the number, type, value, etc., of loans available for review and/or analysis can be organized and displayed in various manners, according to an exemplary embodiment of the present invention, the loans and information associated therewith are grouped into queues 310. According to an exemplary, non-limiting implementation, the queues comprise an analysis queue, management queue, senior management queue, foreclose (FRC) seconds queue, book loss queue, bid at sale queue and FRC senior queue. These exemplary queues are described in more detail as follows.

An analysis queue can include loans in a designated disaster area that are eligible for review. Management queues can include loans which have been reviewed and are waiting for management approval. Senior (Sr.) management loans queues can include high risk loans requiring final approval from senior management. FRC seconds queues can include junior liens which have final approval to foreclose. Book loss queues can include loans which have final approval to dispose of the loan without taking any further action (i.e., walk away form the loan). Bid-at-sale queues can include junior liens which have final approval to bid at the senior lien foreclosure sale. FRC senior queues can include first liens which have final approval to foreclose.

In an exemplary implementation, as shown in FIG. 3, the displayed summary information includes the number of unassigned loans 320 and assigned loans 330 in each queue 320. The number of unassigned loans indicates the total number of loans in the associated queue that have yet to be reviewed or assigned to a specific reviewer appropriate for the loans in the queue. The number of assigned loans indicates the total number of loans in the associated queue that have been assigned to and/or reviewed by an appropriate reviewer.

As shown in FIG. 1, information specific to an individual loan in any of the queues can be accessed and displayed for analysis by the user, S20. In an exemplary implantation, as further shown in FIG. 3, a loan (that is, information specific to the individual loan) can be accessed by entering a loan number, which is a unique identification number assigned to the loan as is well known in the lending industry, in a specified field 340, and initiating a search for the loan in a database comprising loans to be analyzed. In another exemplary implementation, individual loans within each of the queues may be accessed by selecting the displayed number of items 320 or 330 for a particular queue, in which case the next loan (for example, "next" is based on foreclosure sale date, interest paid to date, etc.) is accessed and displayed.

Figure 4:
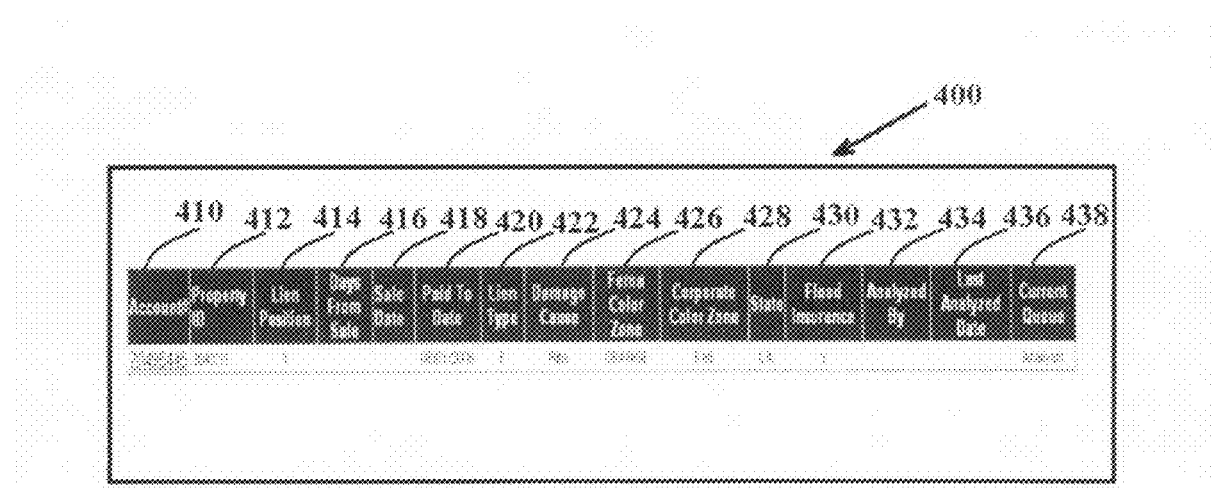
FIG. 4 illustrates a display of information associated with an individual loan when the loan is selected for analysis according to an exemplary embodiment of the present invention.

Upon selection of an individual loan for display and/or analysis, a summary of information associated with the selected loan is displayed, S22 of FIG. 1. As shown in FIG. 4, in an exemplary implementation, summary information associated with an individual loan is displayed in different fields of a display 400 with the associated loan account number being conveniently displayed in one of the fields 410 for reference. The displayed fields that are populated by corresponding loan information may include, but are not limited to:

Property identification field 412—an identification number that can be assigned by the user or lender to every property. In an exemplary implementation, if there are multiple loans on one property, all loans can have the same property identification.

Lien position field 414—an indication of the lien position.

Days from sale field 416—the number of days until the property is going to foreclosure sale regardless of lien position (i.e. if the first and second liens have different sale dates, the days from sale value would reflect the nearest sale date). If there is no sale date, this field can be blank.

Sale date field 418—date when property will be sold.

Paid to date field 420—interest paid-through date.

Lien type field 422—an indication of whether this loan includes a first or a junior lien. For example, designation "F" can signify a first lien, and designation "H" can signify a junior lien.

Damage cause field 424—a specific name of the natural disaster which caused damage to the property.

FEMA color zone field 426—designated disaster zone by FEMA based on damage.

Corporate color zone field 428—a zone designated by the user, based on, for example, damage as defined by the user which may be different from FEMA designation.

State field 430—State where property is located.

Flood insurance field 432—an indication of whether the property had flood insurance paid until the date of disaster, for example 'Y' to indicate affirmative and 'N' to indicate negative, i.e., that there was no paid-up flood insurance.

Analyzed-by field 434—an indication that the loan has been analyzed previously. Such an indication can be made when, for example, the loan is open in 'Analysis Queue' (see FIG. 3), and may include, for example, the analyst's name which will automatically populate the display field (if loan has not been opened this field can remain blank).

Last Analyzed Date field 436—the date when the latest analysis was completed.

Current Queue field 438—the queue (as shown in FIG. 3 and described above) where the loan is currently placed.

According to an exemplary embodiment of the present invention, the loans and the information associated therewith can be sorted based on virtually any of the information available regarding the loan, such as loan number, dates (e.g., a delinquency date), FEMA or corporate color zone, etc. Grouping of the loans by various information categories can further facilitate the loss impact analysis of multiple liens.

According to another exemplary embodiment of the present invention, at least some of the information regarding individual loans can be updated by automatically accessing appropriate information sources. For example, FEMA zone designation can be updated by accessing a FEMA database on the Web. In an exemplary implementation, the updates can be scheduled on a periodic basis (e.g., every six months).

After viewing the loan summary as described above, a user may select the loan for further processing, such as viewing additional information about the loan or performing loan analysis, S24 in FIG. 1. According to an exemplary implementation, as shown in FIG. 4, the user may proceed to detailed viewing or analysis of the loan whose summary is being displayed by selecting the account in the account number field 410. One of ordinary skill in the art would readily appreciate that the selection and/or information entry can be achieved by any of the known user-interactive techniques and methods such as, for example, keyboard and/or touch screen and/or voice recognition commands.

Figure 5:
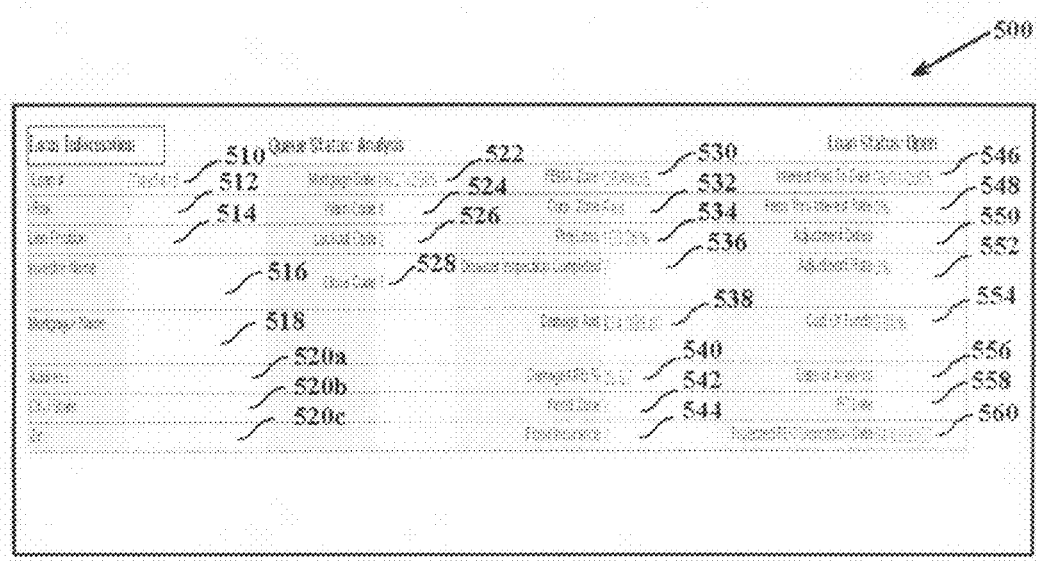
FIG. 5 illustrates a display of general information of an individual loan selected for analysis according to an exemplary embodiment of the present invention.

Referring to FIG. 5, in an exemplary implementation, general loan information can be displayed, S26 in FIG. 1, when the loan is selected for further processing with the associated loan account number being displayed in one of the fields 510 for reference. The queue status, as described above with reference to FIG. 3, in which the loan is currently located is also displayed in the heading of the display. The status of the loan is likewise displayed in heading of the display, indicating that the loan is "open" for analysis and/or review. General information regarding the loan shown in display 500 may include, but is not limited to borrower information, loan status FEMA zone, insurance status and lien position.

Also, information regarding the related loan property may be displayed, including but not limited to damage inspection status, highest estimated damage amount of record and unreconciled damage severity. According to an exemplary embodiment of the present invention, to facilitate loss impact analysis of the loan, general information regarding the loan includes, but is not limited to, the following, as it appears on display 500:

Risk field 512—an indication, using for example "Y" or "N", whether the loan has an internal or external risk associated therewith as defined by the user.

Lien position field 514—an indication of the lien position (also displayed as shown in FIG. 4 in field 414).

Investor name field 516—name of investor on the loan.

Mortgagor name field 518—primary borrower's name.

Address field 520A—property address.

City/State field 520B—city and state where property is located.

Zip field 520C—complete zip code of property.

Mortgage date field 522—date when mortgage (loan) was originated.

Warning code field 524—a user-defined code (for example, a numeric code) that may be used to identify loans with problems or requirements.

Lockout code field 526—a user-defined code (for example, a numeric code) that may be used to indicate that certain actions (for example: sale, review, analysis, etc.) are being taken regarding the loan.

Close code field 528—a user-defined code (for example, a numeric code) indicating the status (for example: delinquent, current, etc.) of the loan.

FEMA zone field 530—designated disaster zone by FEMA based on damage (also displayed as shown in FIG. 4 in field 426).

Corporate zone field 532—a zone designated by the user based on, for example, damage as defined by the user which may be different from FEMA designation (also displayed as shown in FIG. 4 in field 428).

Projected loss field 534—a calculated loss on the loan (for example, a percentage value calculated using damage amount of a recent BPO).

Disaster inspection completed field 536—an indication whether an inspection has been completed on the property (for example, designation "N" signifies that the inspection has not been completed, "U" that inspection status is unknown and "Y" that the inspection has been completed.

Damage amount field 538—amount of damage (for example, dollar value) based on inspection.

Damage/UPB % field 540—Damage amount divided by unpaid principal balance (UPB) multiplied by 100.

Flood zone field 542—an indication whether the property is in a flood zone.

Flood insurance field 544—an indication whether the loan had flood insurance paid until date of disaster (for example, designation "Y" can signify the affirmative, while designation "N" would signify that there was no flood insurance).

Interest paid to date field 546—most recent date through which interest on the loan has been paid.

Pass through interest rate field 548—percentage value of an adjustable rate mortgage (ARM) rate (if applicable to the loan) good through the foreclosure sale date.

Adjustment date field 550—the next date the interest rate will change on an ARM loan.

Adjustment rate field 552—the interest rate that the ARM loan will have as of the adjustment date.

Cost of funds field 554—the cost (for example, a percentage value based on the amount and interest rate) of carrying the money which was/would be advanced to payoff senior debt.

Date of analysis field 556—date that the analysis on the subject loan was completed.

FC date field 558—foreclosure sale date for the subject loan.

Projected Real Estate Owned (REO) disposition date field 560—a user-estimated date that the property will be resold by the lender based on, for example, average state trends.

Figure 13:
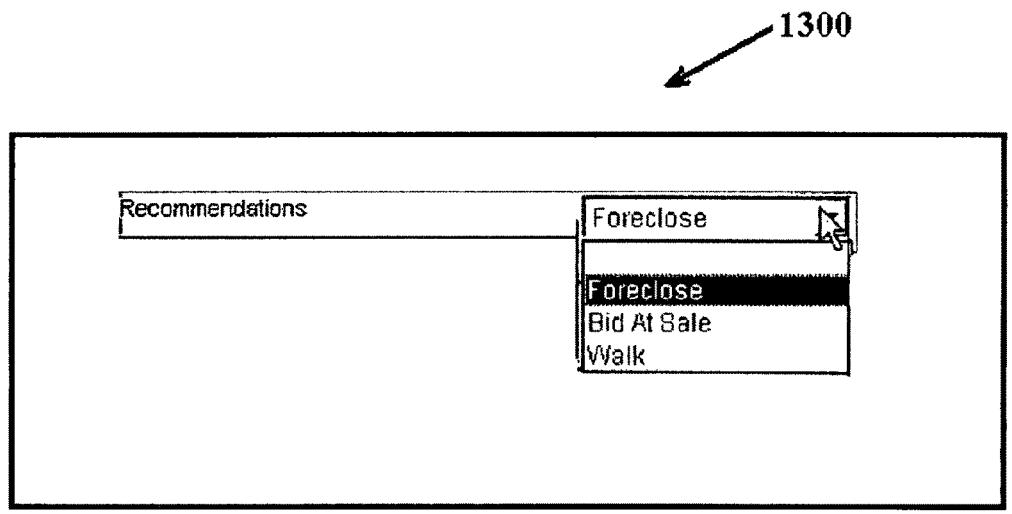
FIGS. 13 and 14 illustrate examples of interactive displays for entering conclusions and recommendations for a selected loan based on analysis of the selected loan according to an exemplary embodiment of the present invention.
Figure 14:
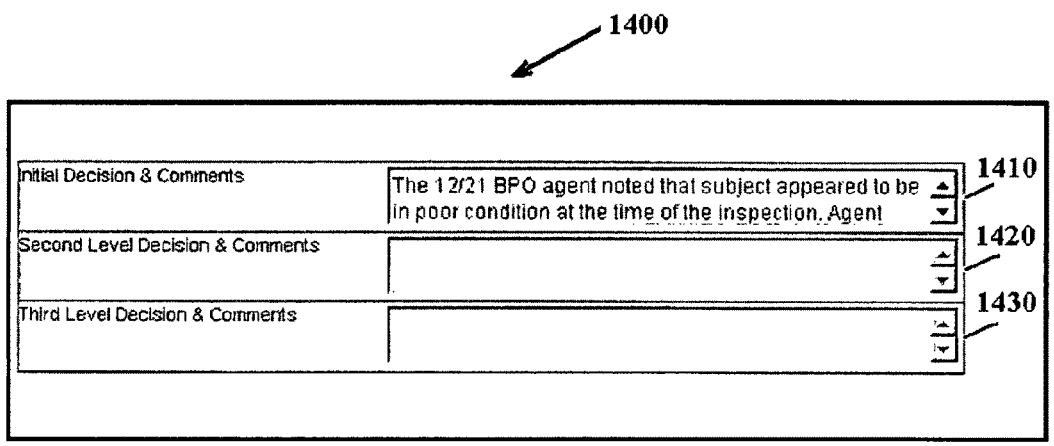
Figure 15:
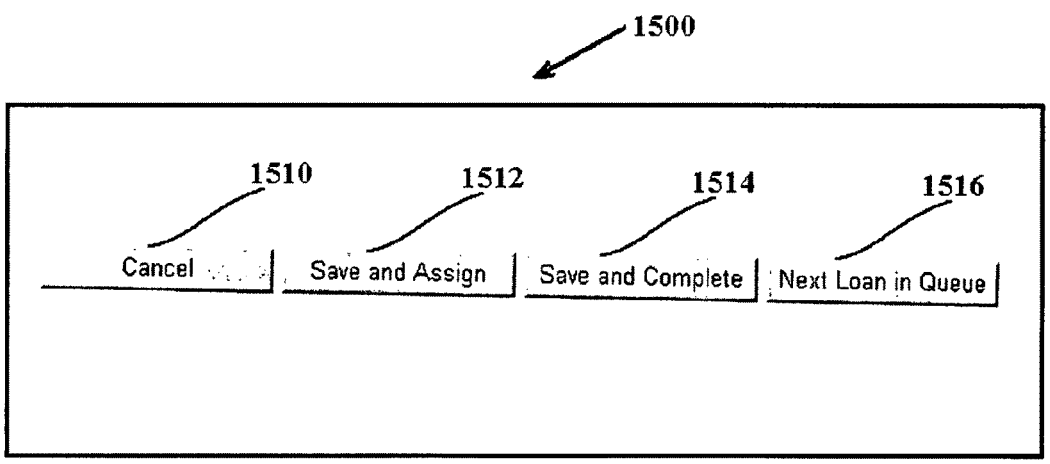
FIG. 15 illustrates an interactive display for exiting loan analysis according to an exemplary embodiment of the present invention.

According to exemplary embodiments of the present invention, after displaying general information regarding the loan selected by the user, specific loan valuation information, S28 in FIG. 1, is provided for user analysis as shown in FIGS. 6 through 11 that can be presented in any order. Subsequently, a summary of user analysis and/or loan information, S30 in FIG. 1, can be displayed as shown in FIG. 12, followed by interactive displays as shown in FIGS. 13 and 14, where the user may have permission to edit displayed information, of recommendations for the disposition of the loan, S32 in FIG. 1. Finally, the user is presented with several options for ending the analysis, S34 in FIG. 1, by either canceling the performed analysis or saving the results as shown in FIG. 15.

Figure 6:
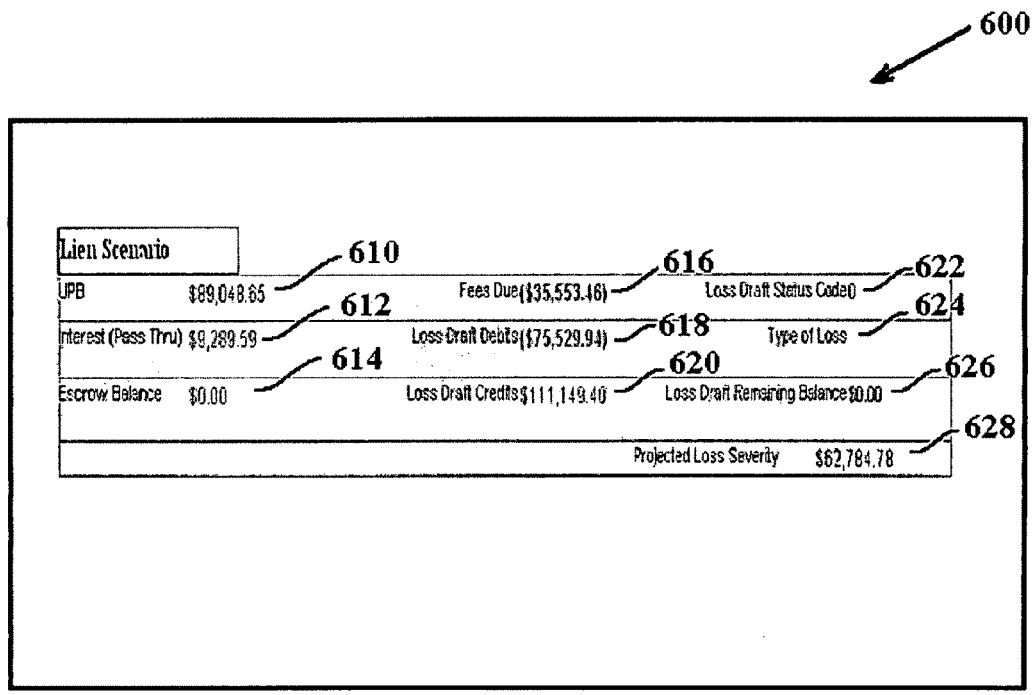
FIG. 6 illustrates a display of detailed information of an individual loan selected for analysis according to an exemplary embodiment of the present invention.

Referring to FIG. 6, an example of specific loan information includes a lien scenario associated with the loan where a user is provided with information that facilitates understanding of, for example, the severity of a loss associated with the subject loan.

A lien scenario display 600 can include, for example, lien information retrieved from a lien holder's database. Examples of information that can be retrieved from a lien holder's database include balance of the lien and lien holder's fees. As shown in FIG. 6, according to an exemplary implementation, information shown on displayed 600 may also include information computed based on the information retrieved from a lien holder's database, such as the unpaid principal balance (UPB) on the lien and total fees due associated with either the property or the lien.

According to an exemplary embodiment of the present invention, information associated with the subject loan also includes loss draft information indicative of any insurance compensation paid on the underlying property (for example, a flood insurance payment). The loss draft information facilitates a more accurate loss impact analysis of the loan by taking into account the fact that there may be money available in the property in addition to unpaid lien balances.

Referring to FIG. 6, according to an exemplary embodiment of the present invention, detailed information included in a lien scenario display 600 includes:

UPB field 610—an unpaid principal balance on the loan.
Interest (Pass Thru) field 612—an estimated interest between interest paid to date and the property's nearest foreclosure sale date.
Escrow balance field 614—an escrow balance on the loan.
Fees due field 616—a balance of total fees due on the loan.
Loss draft debits field 618—a sum of all debits of loss draft in fees due.
Loss draft credits field 620—a sum of all credits of loss draft in fees due.
Projected loss severity field 628—a total debt of the lien being analyzed computed by adding to fees due 616, escrow 614, UPB 610 and interest 612 up until the sale date.
Loss draft status code field 622—a user-defined code that may be used to indicate the stage of the loss draft process of the loan (for example, a code value indicative of the fact that an insurance claim check has been processed)
Type of loss field 624—an indication of the specific type of loss associated with the underlying property (such as hurricane, fire, vandalism, etc.).
Loss draft remaining balance field 626—an amount of money left on disbursement from original insurance claim check.

As noted above, at least some of the information shown in the lien scenario display 600 includes computed information. Referring to the exemplary values shown in the display fields of FIG. 6, such computed information may include projected loss severity (see value of in field 622) computed by subtracting fees due (see value in field 616) from the sum of UPB, interest and escrow balance (see fields 610, 612 and 614, respectively), that is:

($89,048.65+$9,289.59+$0.00)−$35,553.46=$62,784.78.

Referring to FIGS. 7 and 8, valuation data for the subject property for the loan being analyzed is displayed. In an exemplary implementation, estimates of value of the subject property including origination appraisal, BPOs, appraisals and valuation services reconciliations on all liens associated with the property within six months are displayed in a valuation data display 700, as shown in FIG. 7. The display fields may include:

Original appraisal date field 710—the date of appraisal when mortgage was originated.
Origination appraisal amount field 720—an amount of appraisal when mortgage was originated.
Appraisal date field 730—the date of the most recent, current (for example, within the last 6 months) appraisal.
Appraisal amount marketable field 740—the marketable amount of the most recent appraisal.

According to an exemplary implementation, valuation data display 700 may also include an interactive link to a display of BPOs associated with the subject properties. For example, an icon 750 may be provided so that by clicking on this icon, the user is directed to a BPO display 800, as shown in FIG. 8 where all valid BPOs on the subject property are displayed organized by, for example, a loan number. Access to the BPO display may, for example, be in the form or a secure access to a web page by means of a login procedure, which can be implemented in any conventional manner as described above, by the user. In an exemplary implementation as shown in FIG. 8, for each loan BPO display 800 may include:

BPO date field 810—the date that the BPO was received by the lien holder.
BPO amount (market/as is/repaired) field 820—three different values of the property provided by the BPO: marketable, "as is" and repaired.
Reconcile amount field 830—a value associated with quality control (QC) analysis based in reconciliation of discrepancies between existing BPO(s) and appraisal(s).

Figure 9A:
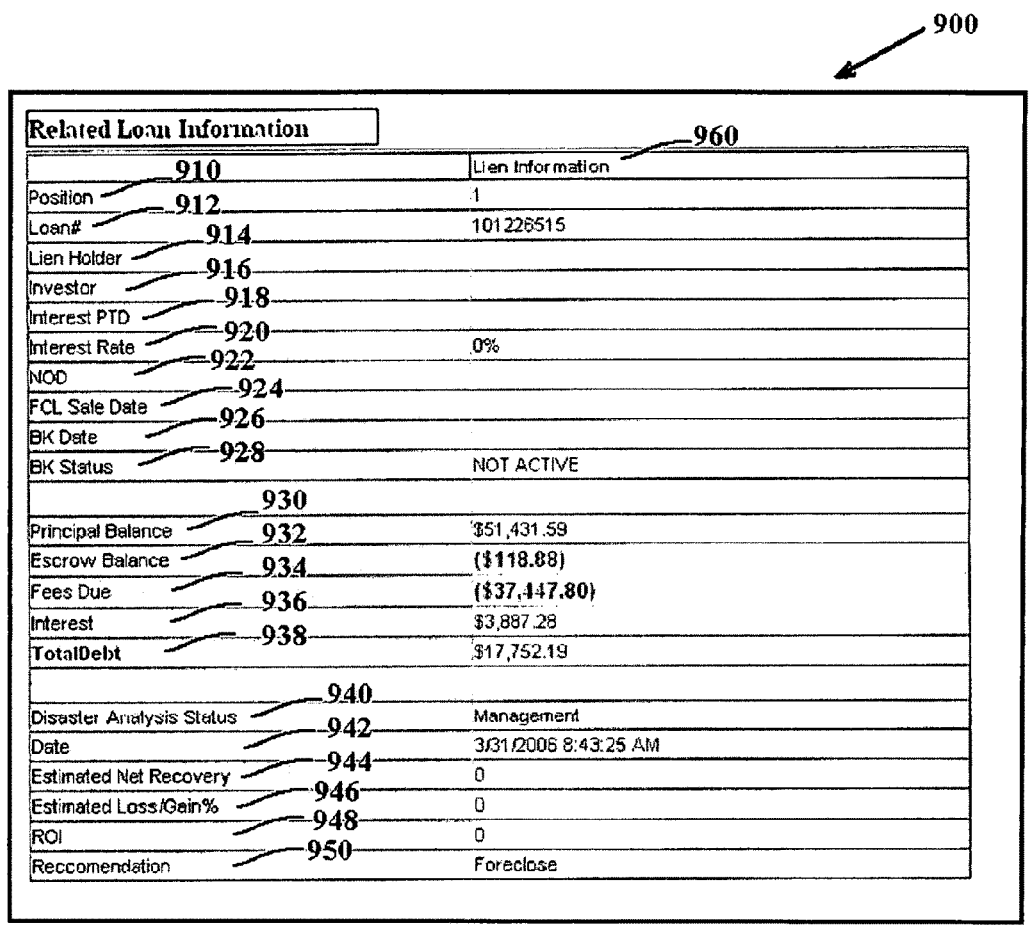
FIG. 9A illustrates a display of summary information of an individual loan selected for analysis according to an exemplary embodiment of the present invention.

According to an exemplary embodiment of the present invention, information related to all lines associated with the subject property can be displayed side-by-side to facilitate the analysis. As shown in FIGS. 9A and 9B, the displayed loan information can comprise a summary of general loan information, bankruptcy and foreclosure status, and total debt, as well as status of and information from loss impact tracking analysis of any number of other liens associated with the property. Referring to FIG. 9A, in an exemplary implantation, related loan information comprises:

Position field 910—lien position.
Loan number field 912—lien holder's loan number of related lien. This field may also be configured to provide an indication of whether the lien is held by the user's institution or an outside institution.
Lien holder field 914—name of the lien holder.
Investor field 916—name of an investor (if any) of the lien.
Interest paid to date (PTD) field 918—Interest paid to date on the lien.
Interest rate field 920—interest rate of the lien.
Notice of default (NOD) field 922—notice of default on the lien.
Foreclosure (FCL) sale date field 924—date of foreclosure sale for the underlying property.
Bankruptcy (BK) date field 926—bankruptcy filing date associate with the lien.
BK status field 928—status of bankruptcy associated with the lien.
Principal balance field 930—principal balance of the lien.
Escrow balance field 932—Escrow balance associated with the lien.
Fees due field 934—the balance of fees due on the lien.

Interest field 936—estimated interest between interest paid to date and underlying property's nearest foreclosure sale date.

Total debt field 938—the total of principle balance, escrow balance, fees due, and interest associated with the lien.

Disaster analysis status field 940—an indication of the queue (as described above with reference to FIG. 3) where the lien is located.

Date field 942—the date the loss impact tracking analysis was completed on related lien.

Estimated net recovery field 944—in an exemplary implementation, if the analysis is being completed on a $1^{st}$ lien, the amount equals projected net proceeds. If loan is a $2^{nd}$ lien or above, it is the difference plus the subject lien.

Estimated loss/gain percentage field 946—in an exemplary implementation, an estimated amount that a lien holder will lose or gain expressed as a percentage value calculated by taking into account the net proceeds.

Return on investment (ROI) field 948—a return on investment on this lien.

Recommendation field 950—a recommendation of what action should be taken on this lien entered by a user (as further described below) based on the loss impact tracking analysis.

While FIGS. 9A and 9B illustrates a related loan information display 900, where lien information is organized in column format, and multiple lien information (lien information 960 and lien information 970) can be organized side-by-side, various organizations of displayed information can be implemented without departing from the teaching of the present invention. In this regard, exemplary implementations of the present invention can further facilitate loss impact tracking analysis when assessing multiple liens by, for example, concurrently displaying the same type of information for multiple liens (as shown in the example of FIG. 9B).

According to an exemplary embodiment of the present invention, loss impact tracking analysis may include information regarding estimated gain or loss associated with a property, estimated net recovery and a must-sell price of the property. The estimated gain or loss may be based on highest damage estimate of record and most recent BPO or appraisal. The estimated net recovery may result from a reconciliation of all damage estimates, BPOs and appraisals associated with subject property. The must-sell price of the property includes information regarding the price at which the property must be sold as real estate owned (REO) so as not to cause the lien holder to incur any additional loss that may be associated with acquiring the property.

According to exemplary embodiments of the present invention, the above-noted information can be displayed in column format where:

Column labeled, for example, 'default' summarizes and presents estimated gain or loss associated with a property with highest damage estimate of record and most recent BPO or appraisal;

Column labeled, for example, 'probable' summarizes and presents estimated net recovery resulting from a reconciliation of all damage estimates, BPOs and appraisals associated with subject property; and Column labeled 'breakeven' summarizes and presents the price at which a property must be sold as an REO not to cause further loss to lien holder from acquiring property.

Referring to FIG. 10, according to an exemplary embodiment of the present invention, an 'acquire and liquidate' scenario computes estimated book value of the property including the unpaid principal balance, interest, fees due and estimated expense of bringing property through foreclosure and presents results to the user in a display 1000 where:

UPB field 1010—current unpaid principal balance on the loan.

Interest field 1012—interest due on the loan.

Tax expense field 1014—any outstanding taxes currently due on the loan.

Insurance expense filed 1016—an estimate of the fees related to the insurance on the property.

Foreclosure expense field 1018—an estimate of the fees related to the foreclosure process based on state guidelines.

Bankruptcy expense field 1020—an estimate of the fees related to the bankruptcy process based on state guidelines.

Eviction expense field 1022—an estimate of the fees related to the eviction process based on state guidelines.

Fees due field 1024—balance in fees due related to the loan and underlying property.

Escrow balance field 1026—balance in escrow account.

Projected book as of REO liquidation field 1028—computed by adding projected loss severity (UPB 1010+ Interest 1012+Fees due 1022+Escrow balance 1024) and tax, insurance, foreclosure, bankruptcy and eviction expenses.

Referring to illustrative values of FIG. 10, an example of projected book value as of REO liquidation (see field 1028) for the default scenario is computed as follows:

$$\text{Projected loss severity} = \$51{,}431.59 + \$3{,}887.28 + \\ (-\$37{,}447.80) + (-\$118.88) \\ = \$17{,}752.19;$$

$$\text{Projected book as of } REO \text{ liquidation} = \$17{,}752.19 + \$1{,}691.06 + \\ \$264.04 + \$264.87 \\ = \$19{,}972.16.$$

In an exemplary implementation of the present invention, the foreclosure, bankruptcy and eviction expenses can be entered by the user in the 'probable' calculations to reflect more accurately actual values associated with these fields, or simply to test different scenarios.

Referring to FIG. 11, according to an exemplary embodiment of the present invention, a Real Estate Owned (REO) analysis can be used to estimate the net proceeds from marketing the property as an REO. Such analysis may include inherent costs of sale and net affects of property damage as shown in display 1100, where:

Established value field 1110—an estimated value of the property as determined by various analyses is reflected in the 'default' calculations. In an exemplary implementation, the user can enter a different value in 'probable' calculations to reflect more accurately actual values associated with this field, or simply to test different scenarios.

Commission field 1112—an amount the broker would receive when property is sold (for example, based on 'Established value'). This value can be adjusted to reflect any actual amount of commission paid.

Closing cost & title field 1114—estimated closing and title costs (for example, 1.5% of the 'Established value').

Miscellaneous fees field 116—any other fees not already included in the calculations. In an exemplary implementation, the user can enter a value in 'probable' calculations to reflect more accurately actual values associated with this field, or simply to test different scenarios.

Established damage field 1118—a value taken directly from 'Damage amount' from 'Loan Information' section (see field filed 538 in FIG. 5).

Additional damage estimate field 1120—a value that can be used to add to the established damage by entering a positive number or can subtract from the amount by entering a negative number. In an exemplary implementation, the user can enter a different value in 'probable' calculations to reflect more accurately actual values associated with this field, or simply to test different scenarios.

Projected net proceeds filed 1122—an estimated dollar amount left over if the property is sold for the established value, subtracting commission, closing costs & title and damage.

As noted above, exemplary implementation of certain embodiments of the present invention can facilitate analysis of multiple liens. In the example of display 1100 as shown in FIG. 11, if the loan analyzed by the user is in the first lien position, display 1100 will include section 1130 where all senior lien fields 1132, as well as senior escrow, fees due, interest, FCL/BK/Eviction fields 1134 which all added up on loan's senior lien, are set to $0.00.

On the other hand if the loan analyzed by the user is in a junior lien position, the display 1100 will include section 1140 where:

Senior lien #1 field 1142—an unpaid principal balance on loan's senior lien. If the loan is a first lien, all fields are set to $0.00.

Senior lien #1 escrow, fees due, interest, FCL/BK/Eviction field 1144—six different fees that added up on loan's senior lien.

Senior total debt field 1146—total debt on loan's senior lien.

In the example of FIG. 11, the value in senior lien #1 field 1142 is the same as in UPB field 1010 of FIG. 10 and the value in senior total debt field 1146 is the same as in senior total debt field 1146 of FIG. 10. On the other hand, the value in field 1144 is computed with reference to the values in fields 1026, 1024, 1012, 1018, 1020 and 1022 as follows (in the example of 'default' calculations):

(−$118.88)+(−$37,447.80)+$3,887.28+$1,691.06+ $264.04+$264.87=(−$31,459.43)

Referring to FIG. 12, according to an exemplary embodiment of the present invention, a summary of the loss impact analysis can be shown in a display 1200 where potential gain or loss associated with acquiring the subject property as an REO are presented in terms of information from which 'foreclose', 'bid' or 'walk' recommendations can be determined regarding the subject lien. The displayed information includes, but is not limited to, for example:

Net sale proceeds field 1210—displays the same information as in projected net proceeds field in 1122 in REO analysis display 1100 of FIG. 11.

Investment field 1212—the combined total debt of analyzed lien and all its senior liens.

Difference field 1214—computed by subtracting investment field 1212 value from net sales proceeds field 1210 value.

Subject lien field 1216—displays the same information as projected book as of REO liquidation.

Net recovery field 1218—If the analysis is being completed on a first lien, the amount equals projected net proceeds. If loan is a second lien or above, it is the difference (field 1244) plus the subject lien (field 1216).

Projected ROI field 1220—return on investment of money advanced by junior lien to acquire property. If the loan is in first lien position, this will not be applicable and will display as 0%.

Walk severity loss severity field 1222—total amount of loss if lien holder chooses to walk from property.

Net recovery if acquired as REO field 1224—displays the same information as net recovery field 1218.

Variance loss reduction (increase) field 1226—a computed difference between what would be gained if lien holder chooses to bid at sale versus what would be lost if lien holder chooses to walk.

Balboa projected vs. actual field 1228—projected loss amount based on 'default' calculation versus projected loss amount based on 'probable' calculation.

As shown in FIG. 13, according to an exemplary implementation, after review of the analysis, the user can provide and record recommendation either to 'Bid At Sale', 'Walk', or 'Foreclose' on the lien as shown in display 1300. According to yet another exemplary implementation, based on the foregoing recommendations, a user can offer and record 'Initial Decision & Comments' that can be entered and displayed as shown in display 1400 of FIG. 14. In yet another exemplary implementation, in addition to 'Initial Decision & Comments' displayed and/or recorded in field 1410, 'Second Level' and 'Third Level' decisions can be displayed in fields 1420 and 1430, respectively. In an exemplary implementation 'Second Level' and/or 'Third Level' decision can be recorded, for example by managers, after further reviewing the analysis including any recorded recommendations and comments recorded by the previous users.

Various options for terminating and exiting a system implementing loss impact analysis according to exemplary embodiments of the present invention are available to the user. In an exemplary implementation, as shown in FIG. 15, the following options for selection by the user when exiting the system as presented in display 1500 where:

Cancel option 1510—exits the loan without saving information.

Save and Assign option 1512—saves any information which has been entered and moves loan into technician's assigned queue.

Save and Complete option 1514—save any information that has been entered including recommendation that has been made and indicate that analysis of the subject is completed. The subject loan then moves to the next queue (i.e. analysis to management).

Next Loan in Queue option 1516—moves current loan to the assigned queue and the next loan to be analyzed is assigned.

The foregoing embodiment and advantages are merely exemplary and are not to be construed as limiting the present invention. The present teaching can be readily applied to other types of loss impact analysis, and many alternatives, modifications, and variations will be apparent to those skilled in the art. For example, other implementations may include reporting of delinquency and anticipated loss, inclusion of PMI coverage. Also, ability to perform updated analysis for future review based on previously-performed assessment can be provided. According to yet another exemplary implementation, results of loss impact analysis can be provided to other systems for coordinated efforts among diverse entities that may be servicing the loan.

Accordingly, the description of the exemplary embodiments of the present invention is intended to be illustrative, and not to limit the scope of the invention which is defined in the following claims and their equivalents.

What is claimed is:

1. A method for assessing loss associated with a loan, the method comprising:

designating status queues for a plurality of existing loans;

assigning by a computer at least one loan of the plurality of the existing loans and loan information associated with the at least one loan to one of the designated status queues based on at least the loan information;

accessing the at least one loan and loan information associated therewith from at least one of the designated status queues;

displaying the loan information;

updating the loan information based on an analysis; and re-assigning by a computer the loan and the loan information to at least one of the designated status queues based on the updating of the loan information, wherein the analysis comprises assessment of loss associated with disposition of the loan, and the re-assigning comprises determination of status queues based on the assessment.

2. The method of claim 1, wherein the status queues comprise at least one of a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by lender.

3. The method according to claim 1, wherein the updating of the loan information comprises receiving a recommendation for disposition of the loan based on the analysis.

4. The method according to claim 3, wherein the recommendation comprises an indication of at least one of foreclosure, bid-at-sale and disposition.

5. The method according to claim 1, wherein the information associated with the at least one loan comprises at least one of value of underlying property, delinquency information, disaster area designation of the underlying property and insurance payments information related to the underlying property.

6. The method according to claim 5, wherein the disaster area designation comprises at least one of a FEMA zone designation and a lender zone designation.

7. The method according to claim 5, wherein the value of the property comprises information based on at least one BPO.

8. The method according to claim 1, wherein the information associated with the at least one loan is retrieved from at least one Web-based data-base.

9. The method according to claim 1, wherein the information associated with the at least one loan is periodically updated manually when displaying the information or automatically by accessing at least one Web-based data base.

10. The method according to claim 1, wherein the loan information comprises a plurality of liens and lien information associated therewith, and the displaying comprises displaying the plurality of liens and the lien information associated therewith to facilitate the analysis.

11. The method according to claim 10, wherein the displaying comprises concurrently displaying like lien information for the plurality of respective liens.

12. The method according to claim 1, wherein the displaying and analysis comprises:

first displaying the loan information and results of calculations based thereon;

second displaying and providing interactive input of test information; and third displaying results of calculations based on the test information.

13. The method according to claim 12, wherein the information displayed in the first, second and third displaying is displayed concurrently to facilitate comparative analysis thereof.

14. The method according to claim 1, wherein the analysis comprises evaluation of fees associated with disposition of the loan, wherein the disposition comprises at least one of foreclosure and bid-at-sale.

15. The method according to claim 1, wherein an underlying property associated with the at least one loan comprises a disaster-affected property, the information comprises insurance payment information associated with damage to the underlying property, and the analysis comprises evaluation of the insurance payment information to assess loss associated with disposition of the loan.

16. The method as claimed in claim 1, wherein a plurality of loans are assigned to the queues and information associated with each of the respective loans comprises at least one of value of underlying property, delinquency information, disaster area designation of the underlying property and insurance payments information related to the underlying property, the method further comprising sorting the loans and information associated therewith by at least one of the value of underlying property, the delinquency information, the disaster area designation of the underlying property and the insurance payments information related to the underlying property.

17. A system for assessing loss associated with a loan, the system comprising:

a display configured to provide interactive viewing of information;

an input device configured to receive user input; and a controller configured to provide access to the information and facilitate manipulation of the information on the display based on the user input;

wherein:

the information comprises at least one loan of a plurality of existing loans and loan information associated with the at least one loan assigned by a computer to one of a plurality of designated status queues based on at least the loan information;

the at least one loan and loan information associated therewith is accessible from at least one of the designated status queues for viewing on the display;

the loan information is updated based on at least one of an analysis and a user input;

the user input comprises at least one of data for the manipulation of the information on the display and data for updating the loan information; and the controller is configured to re-assign the loan and the loan information to at least one of the designated status queues based on the updating of the loan information, wherein the analysis comprises assessment of loss associated with disposition of the loan, and the re-assigning by the controller comprises determination of status queues based on the assessment.

18. The system of claim 17, wherein the status queues comprise at least one of a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by lender.

19. A non-transitory computer readable medium having stored thereon set of instructions configured to cause a computer processor to facilitate assessing loss associated with a loan, the instructions comprising:
- a first set of instructions for designating status queues for a plurality of existing loans;
- a second set of instructions for assigning by a computer at least one loan of the plurality of the existing loans and loan information associated with the at least one loan to one of the designated status queues based on at least the loan information;
- a third set of instructions for accessing the at least one loan and loan information associated therewith from at least one of the designated status queues;
- a fourth set of instructions for displaying the loan information;
- a fifth set of instructions for updating the loan information based on at least one of an analysis and a user input; and
- a sixth set of instructions for re-assigning by a computer the loan and the loan information to at least one of the designated status queues based on the updating of the information,
- wherein the analysis comprises assessment of loss associated with disposition of the loan, and the re-assigning comprises determination of status queues based on the assessment.

20. The non-transitory computer readable medium of claim 19, wherein the status queues comprise at least one of a queue for loans eligible for review, a queue for loans reviewed based on the analysis, a queue for loans having a certain risk factor associated therewith, a queue for loans designated for foreclosure, a queue for loans having a certain lien position associated therewith, a queue for loans designated for bid-at-sale, and a queue for loans designated for disposition without any further action by lender.

* * * * *